United States Patent Office 2,698,153
Patented Dec. 28, 1954

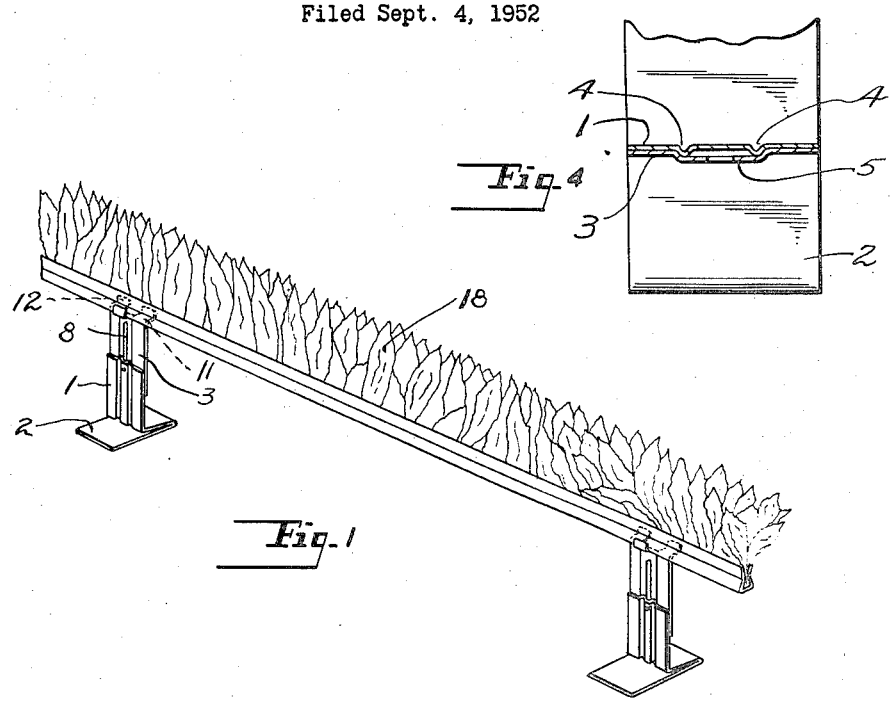
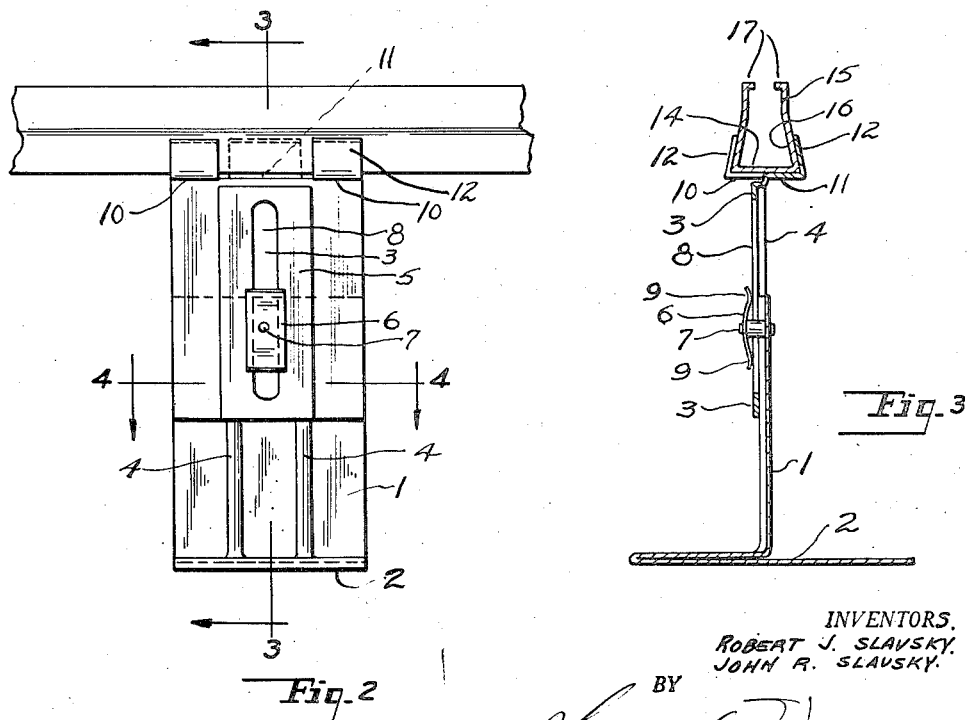

2,698,153

HOLDER FOR ELONGATED OBJECTS

Robert J. Slavsky and John R. Slavsky, Detroit, Mich., assignors to Shaw and Slavsky, Inc., Detroit, Mich., a corporation of Michigan Application September 4, 1952, Serial No. 307,747

3 Claims. (Cl. 248—161)

The present invention pertains to a novel holder for supporting an elongated object, two such holders being ordinarily sufficient for one object, although more holders may be used if the object is exceptionally long. The supported object in this case, merely by way of example, is a channel member in which is clamped an assembly of rubber leaves resembling green parsley. This device is used in displaying meat in store counters.

One of the objects of the invention is to provide such a holder in which the elongated object may be inserted and firmly held without the use of manual adjustment. Another object is to provide for the vertical adjustment of the holder, according to the height of the meats displayed, also without manual adjustment of the clamping parts.

In the accomplishment of these objects, each holder includes a vertical base member with suitable footing and another member slidably mounted thereon. The sliding relation is obtained by means of a clip carried by one of the members and engaging the other member to hold them clamped together with such tightness as to hold the members in any desired adjustment. Adjustment is made merely by moving the sliding member up or down against the friction of the clip.

The upper edge of the movable member carries a clip which comprises at least two opposed binding elements. The elongated object to be supported includes a channel member, as stated, inserted between the sides of the clip. The channel has upwardly converging side walls, and the opposed binding elements of the clip also converge upwardly and are spaced apart to frictionally engage the side walls of the channel member. Thus, when the channel member is inserted in the clip, it is frictionally held therein against accidental sliding. Ordinarily, two such holders are used in supporting a length of channel.

The invention is fully disclosed by way of example in the following description and in the accompanying drawings in which Figure 1 is a perspective view of the device in use;
Figure 2 is a front elevation of one of the holders;
Figure 3 is a section on the line 3—3 of Figure 2, and
Figure 4 is a section on the line 4—4 of Figure 2.

Reference to these views will now be made by use of like characters which are employed to designate corresponding parts throughout.

The holder includes a vertical base member 1 preferably made of sheet metal and formed at its lower end with a relatively wide horizontal foot 2. A similar vertical member 3 is laid against the member 1. The latter has a pair of spaced vertical ribs 4 enclosed in a trough 5 formed in the member 3, forming a vertical guide.

One of the members, preferably the member 1, carries a sheet metal clip 6 carried on a pin 7. In such case the bottom of the trough 5 is slotted lengthwise at 8 to permit sliding along the clip and pin. The clip engages the member 3 at the surface that is outward from the member 1 and thus constitutes a friction clamp between the parts. The clip is bent to engage this surface at upper and lower lines 9, and the pressure is such that the adjustable member 3 may be pulled manually and yet remain in any adjusted position notwithstanding the load thereon as will presently be described.

The upper edge of the member 3 is formed with a pair of flanges 10 extending horizontally therefrom in the same direction and with another flange 11 between the flanges 10 and extending in the opposite direction. Each flange is formed with a lip 12, and the lips at opposite sides of the plane of the member 3 converge upwardly for a purpose that will presently be described.

The member to be supported in the present instance is a channel having a flat base 14 and side walls 15, the lower portions of the side walls converging upwardly as indicated by the numeral 16 in Figure 3. The upper edges of the side walls are curved inwardly at 17 to clamp an assembly of rubber leaves 18 resembling green parsley or other trimming for a counter display of meat.

The channel member is inserted between the single lip on one side and the two lips on the other side. The base 14 rests on the flanges 10, 11, and the lips 12 are so spaced and dimensioned as to frictionally engage the converging portions 16 of the side walls 15. The channel member may be slid manually to the desired position in the holder, and thereafter the lips 12 exert sufficient pressure thereon to prevent undesired sliding. Two such holders are sufficient to support the usual lengths of channel, although more may be used if desired.

It is desirable to regulate the height of the holders as the height of the display is decreased or increased. Such adjustment is made merely by pushing the channel member 10 or pulling it up against the friction of the clip 6. As already indicated, the pressure of the clip is sufficient to hold the member 3 in the selected position. Such a clip is disclosed and described in greater detail in our copending application Serial No. 286,696, filed May 8, 1952. In pulling the channel member upward, the weight of a loaded tray on the foot 2 is usually sufficient to hold the member 1. Otherwise the latter may be held by the hand.

Although a specific embodiment of the invention has been illustrated and described, it will be understood that various alterations in the details of construction will be made without departing from the scope of the invention as indicated by the appended claims.

What we claim is:

1. A holder comprising a plane sheet member, a pair of spaced flanges extending in one direction from the upper edge thereof, another flange extending from the same edge and in the opposite direction, said flanges being rigidly mounted relatively to each other and providing a substantial supporting area, all of said flanges lying in one horizontal plane, a lip extending upward from each of said flanges and directed away from said sheet member, the lip on the last named flange converging upwardly toward the lips on the pair of flanges, and a supporting foot at the lower edge of said member.

2. A holder as set forth in claim 1, in combination with an elongated member having a flat base and converging side walls, inserted between said lips, said base resting on said flanges, and said side walls being in surface engagement with said lips.

3. A holder comprising a vertical sheet member, a supporting foot at the lower end of said member, flanges extending in opposite directions from the upper edge of said sheet member, a lip upwardly extending from each of said flanges and directed away from said sheet member, said lips converging relatively to each other in the direction away from said sheet member.

References Cited in the file of this patent

UNITED STATES PATENTS

| Number | Name | Date |
|---|---|---|
| 1,329,422 | McKelvey et al. | Feb. 3, 1920 |
| 1,454,213 | Chapman et al. | May 8, 1923 |
| 1,584,105 | Lenz | May 11, 1926 |
| 1,622,058 | Sohnle | Mar. 22, 1927 |
| 1,631,355 | Baldwin | June 7, 1927 |